No. 800,728. PATENTED OCT. 3, 1905.
G. H. ELLIS & C. I. LONGENECKER.
FRICTION CLUTCH.
APPLICATION FILED MAR. 8, 1905.
2 SHEETS—SHEET 1.
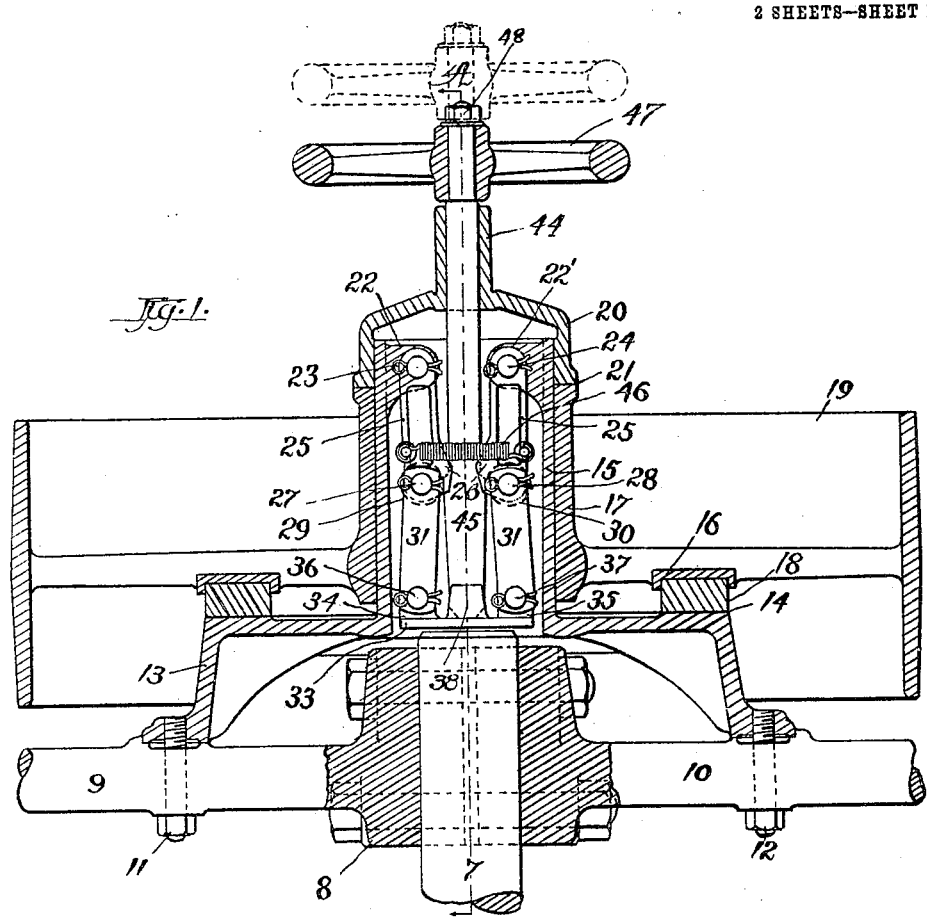
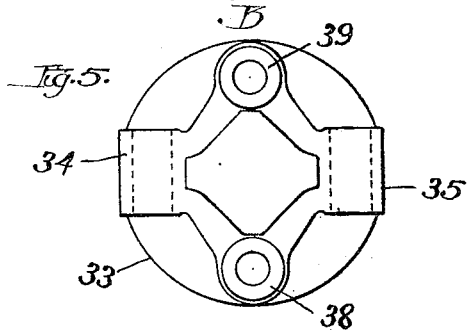
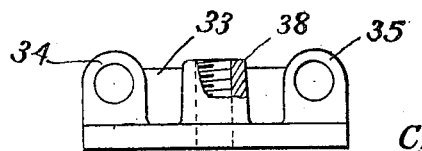
Witnesses:
F. W. Hoffmeister.
T. H. Alfred.
Inventors
George H. Ellis
Charles I. Longenecker
By C. W. Burgess
Atty.

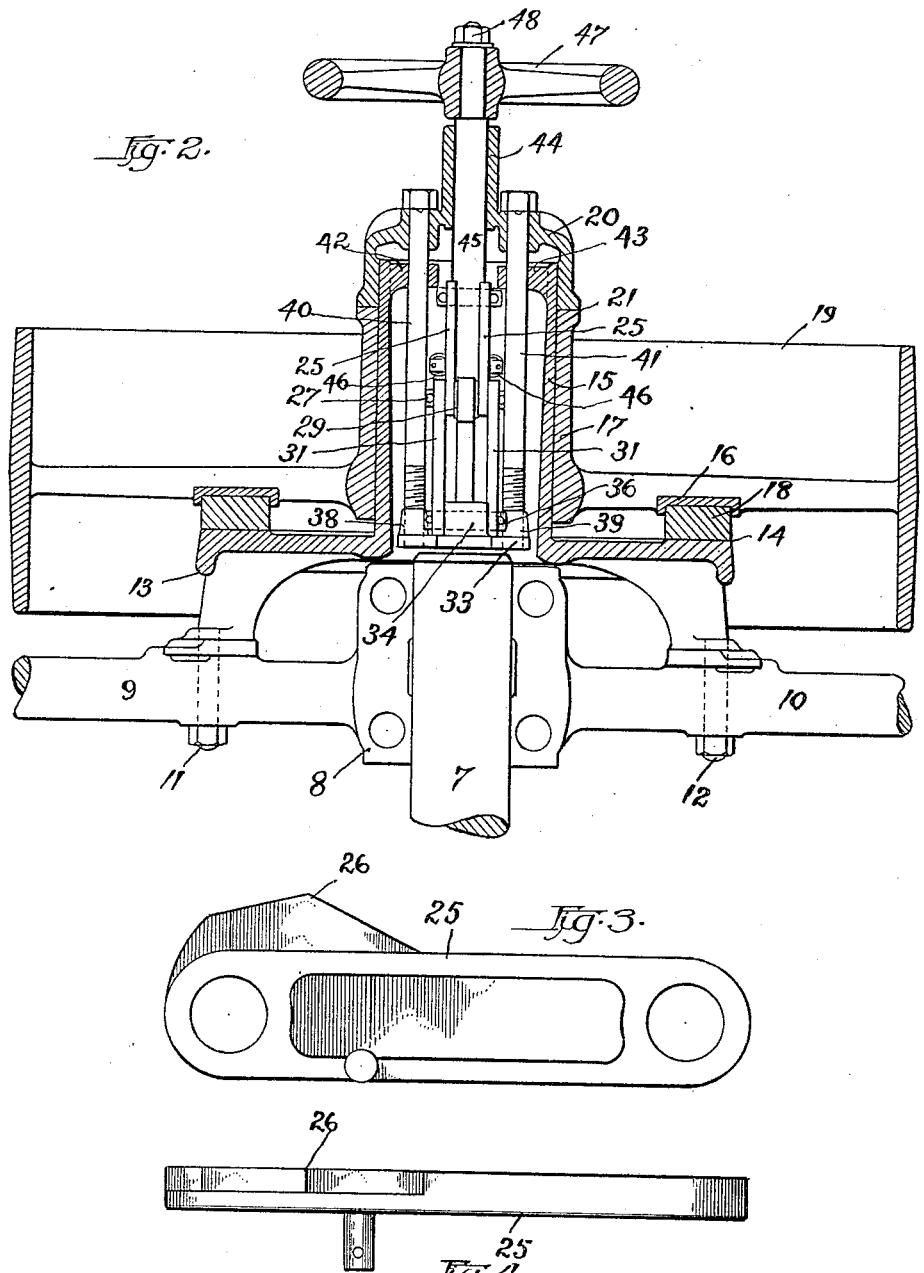

UNITED STATES PATENT OFFICE.

GEORGE H. ELLIS AND CHARLES I. LONGENECKER, OF CHICAGO, ILLINOIS, ASSIGNORS TO INTERNATIONAL HARVESTER COMPANY, A CORPORATION OF NEW JERSEY.

FRICTION-CLUTCH.

No. 800,728.     Specification of Letters Patent.     Patented Oct. 3, 1905.

Application filed March 8, 1905. Serial No. 249,018.

*To all whom it may concern:*

Be it known that we, GEORGE H. ELLIS and CHARLES I. LONGENECKER, citizens of the United States, residing at Chicago, in the county of Cook and State of Illinois, have invented certain new and useful Improvements in Friction-Clutches, of which the following is a specification, reference being had to the accompanying drawings, forming a part thereof.

Our invention relates to friction-clutches, and belongs to that class usually called "single-face." It is particularly designed to be applied at the end of a driving-shaft having a clutch member secured thereto.

It consists in a hollow-hub extension of the fixed clutch member, upon which is journaled the movable member, and a system of toggle-levers is suitably mounted within the hollow hub and connected with the movable member in a manner to engage or disengage it from the fixed member, the object of the invention being to provide a clutch mechanism that is strong and cheaply constructed and powerful in operation. We attain these objects by the mechanism illustrated in the accompanying drawings, in which—

Figure 1 is a plan view, partly in section, of the clutch mechanism. Fig. 2 is a side elevation, partly in section, of Fig. 1 along line A B. Fig. 3 is a plan view of one of the toggle-links. Fig. 4 is a side elevation of Fig. 3. Fig. 5 is a plan view of the toggle-head, and Fig. 6 is a side elevation of Fig. 5.

Similar numerals denote similar parts throughout the various views.

A shaft 7 has secured thereto at one end a pulley or fly wheel 8, having the spokes 9 and 10. Secured to the spokes by means of the bolts 11 and 12 is a clutch member 13, provided with a friction-face 14 and an outwardly-extending hollow hub 15, adapted to receive a complementary clutch member 16, having its hub portion 17 loosely journaled thereon and provided with the removable friction-ring 18, the clutch member, as shown, forming part of a pulley 19.

20 is a cap-piece journaled on the hub 15 outside the hub 17 and having the friction-surface 21 adapted to engage therewith. The hollow hub 15 is provided with inwardly-projecting ear portions 22 and 22' at its outer end, that are provided with openings to receive the pins 23 and 24, that project beyond the ears and receive one end of the toggle-links 25. The toggle-links are made right and left and adapted to operate in series upon opposite sides of a longitudinal center line. They are provided with openings at their inner ends that receive joint-pins 27 and 28, and rollers 29 and 30 are journaled upon the pins between each series of links, the pins projecting beyond the links, and are adapted to receive supplemental toggle-links 31 upon opposite sides of the center line.

33 is a toggle-head located within the hollow hub 15 at its inner end and provided with ear portions 34 and 35, through which pass joint-pins 36 and 37, that receive at their outer ends the inner ends of the supplemental toggle-links. The toggle-head 33 is provided with longitudinally-disposed bosses 38 and 39, that are arranged between the ear portions 34 and 35 and have threaded openings therethrough adapted to receive the threaded ends of draw-bolts 40 and 41, that pass through openings in the cap-piece 20 and inwardly-projecting guiding-ears 42 and 43 at the outer end of the hollow hub 15, the heads of the bolts being provided on their inner surfaces with a V-shaped tooth that is adapted to engage with corrugations in the surface of the cap-piece surrounding the openings for the bolts for the purpose of preventing any accidental turning of the same.

The cap-piece 20 is provided with a central opening 44, adapted to form a guide for a longitudinally-sliding wedge 45, that contacts with the inner surfaces of the rollers 29 and 30, that are drawn together by means of springs 46, connected with the toggle-links 25. The links are provided with inwardly-projecting lip portions 26, that are oppositely disposed, and the series form a box-shaped guide for the wedge. A hand-wheel 47 is loosely journaled upon the outer end of the sliding wedge 45 and is held thereon by means of the nut 48.

In the operation of our device to engage the loose member of the clutch with the driving member the operator grasps the hand-wheel 47 and pushes inward on the wedge 45, which operates to move the double toggles outward at their central portion through their contact with opposite sides of the wedge by means of the rollers, which results in a movement of the toggle-head longitudinally inward and a consequent drawing inward of the cap-piece by means of the connecting-bolts. The said cap-piece bearing against the outer end of the hub 17 with its friction-surface 21 will move said hub longitudinally inward and cause the friction-surface of the ring 18 to contact with the friction-face of the fixed member of the clutch. As the friction-surfaces become worn the toggles may be adjusted by means of the draw-bolts to compensate therefor.

What we claim as our invention, and desire to secure by Letters Patent, is—

1. In a friction-clutch, the combination of a clutch member provided with a friction-surface and a hollow hub, a second clutch member having a friction-surface and free to move longitudinally along said hollow hub upon which it is journaled, a third clutch member, having corresponding friction-surfaces, journaled upon said hollow hub and free to move longitudinally thereon between said first two members, a toggle-lever within said hollow hub having one end connected therewith and its opposite end connected with the second clutch member, and means for operating said toggle to move said second clutch member longitudinally of the hollow hub.

2. In a friction-clutch, the combination of a clutch member provided with a friction-surface and a hollow hub, a second clutch member having a friction-surface and free to move longitudinally along said hollow hub upon which it is journaled, a third clutch member, having corresponding friction-surfaces, journaled upon said hollow hub and free to move longitudinally thereon between said first two members, a toggle-lever within said hollow hub having one end connected therewith and its opposite end connected with the second clutch member, and a wedge slidably mounted within the hollow hub and adapted to operate said toggle-lever in a manner to move said second clutch member in contact with said third clutch member.

3. In a friction-clutch, the combination of a clutch member provided with a friction-surface and a hollow hub, a second clutch member having a friction-surface and free to move longitudinally along said hollow hub, upon which it is journaled, a third clutch member having corresponding friction-surfaces, journaled upon said hollow hub and free to move longitudinally thereon between said first two members, two toggle-levers within said hollow hub upon opposite sides of its axial line, a toggle-head, said levers having one end connected to said toggle-head and their opposite ends connected with said hollow hub, a connection between said toggle-head and said second clutch member, and means for moving said toggle-levers in a manner to move said second clutch member in engagement with said third member.

4. In a friction-clutch, the combination of a clutch member provided with a friction-surface and a hollow hub, a second clutch member having a friction-surface and free to move longitudinally along said hollow hub, upon which it is journaled, a third clutch member, having corresponding friction-surfaces, journaled upon said hollow hub and free to move longitudinally thereon between said first two members, two toggle-levers within said hollow hub upon opposite sides of its axial line, a toggle-head, said levers having one end connected to said toggle-head and their opposite ends connected with said hollow hub, a connection between said toggle-head and said second clutch member, and a wedge slidably mounted within the hollow hub and adapted to operate said toggle-levers in a manner to move said second clutch member in contact with said third member.

5. In a friction-clutch, the combination of a clutch member provided with a friction-surface and a hollow hub, a second clutch member having a friction-surface and free to move longitudinally along said hollow hub, upon which it is journaled, a third clutch member, having corresponding friction-surfaces, journaled upon said hollow hub and free to move longitudinally thereon between said first two members, two toggle-levers within said hollow hub upon opposite sides of its axial line, a toggle-head, said levers having one end connected to said toggle-head and their opposite ends connected with said hollow hub, an adjustable connection between said toggle-head and said second clutch member, and a slidable wedge mounted within the hollow hub and adapted to operate said toggle-levers in a manner to move said second clutch member in contact with said third member.

6. In a friction-clutch, the combination of a clutch member provided with a friction-surface and a hollow hub, a second clutch member having a friction-surface and free to move longitudinally along said hollow hub, upon which it is journaled, a third clutch member having corresponding friction-surfaces, journaled upon said hollow hub and free to move longitudinally thereon between said first two members, two oppositely-disposed and inwardly-projecting ears within said hollow hub at one end, parallel pins journaled in said ears, a series of toggle-links connected with opposite ends of said pins, a toggle-head free to move within the opposite end of said hollow hub, parallel pins journaled in said head, a second series of toggle-links connected with opposite ends of said pins, joint-pins connecting the two series of links, rollers journaled on the central portion of the joint-pins, bolts connecting said toggle-head with said second clutch member, an axially-disposed movable wedge within said hub, contacting with said rollers in a manner to cause the links to move said toggle-head to draw the clutch-surfaces in contact.

7. In a friction-clutch, the combination of a clutch member provided with a friction-surface and a hollow hub, a second clutch member having a friction-surface and free to move longitudinally along said hollow hub, upon which it is journaled, a third clutch member having corresponding friction-surfaces, journaled upon said hollow hub and free to move longitudinally thereon between said first two members, two oppositely-disposed and inwardly-projecting ears within said hollow hub at one end, parallel pins journaled in said ears, a series of links connected with opposite ends of said pins, a toggle-head free to move within the opposite end of said hollow hub, parallel pins journaled in said head, a second series of links connected with opposite ends of said pins, joint-pins connecting the two series of links, rollers journaled on the central portion of the joint-pins, adjustable bolts connecting said toggle-head with said second clutch member, an axially-disposed movable wedge within said hub supported by a bearing in said second clutch member and by projecting lips on the adjacent links and contacting with said rollers in a manner to cause the links to move said toggle-head to draw the clutch-surfaces in contact.

8. In a friction-clutch, the combination of a clutch member provided with a friction-surface and a hollow hub, a second clutch member having a friction-surface and free to move longitudinally along said hollow hub, upon which it is journaled, a third clutch member having corresponding friction-surfaces, journaled upon said hollow hub and free to move longitudinally thereon between said first two members, two oppositely-disposed and inwardly-projecting ears within said hollow hub at one end, parallel pins journaled in said ears, a series of toggle-links connected with opposite ends of said pins, a toggle-head free to move within the opposite end of said hollow hub, parallel pins journaled in said head, a second series of toggle-links connected with opposite ends of said pins, joint-pins connecting the two series of links, rollers journaled on the joint-pins, adjustable draw-bolts connecting said toggle-head with said second clutch member, an axially-disposed movable wedge within said hub, supported by a bearing in said second clutch member, a hand-wheel journaled upon the projecting end of the wedge and adapted to adjust it longitudinally in contact with said rollers to move said links in one direction in a manner to cause the links to move said toggle-head to draw the clutch-surfaces in contact.

9. In a friction-clutch, the combination of a clutch member provided with a friction-surface and a hollow hub, a second clutch member having a friction-surface and free to move longitudinally along said hollow hub, upon which it is journaled, a third clutch member having corresponding friction-surfaces, journaled upon said hollow hub and free to move longitudinally thereon between said first two members, two oppositely-disposed and inwardly-projecting ears within said hollow hub at one end, parallel pins journaled in said ears, a series of toggle-links connected with opposite ends of said pins, a toggle-head free to move within the opposite end of said hollow hub, parallel pins journaled in said head, a second series of toggle-links connected with opposite ends of said pins, joint-pins connecting the two series of links, rollers journaled on the joint-pins, adjustable draw-bolts connecting said toggle-head with said second clutch member, an axially-disposed longitudinally-movable wedge within said hub, supported by a bearing in said second clutch member, and contacting with said rollers, a hand-wheel journaled upon the projecting end of the wedge adapted to move it longitudinally to separate said rollers, and springs operative to hold said rollers in contact with said wedge.

10. In a friction-clutch, the combination of a clutch member provided with a friction-surface and a hollow hub, a second clutch member having a friction-surface and free to move longitudinally along said hollow hub, upon which it is journaled, a third clutch member having corresponding friction-surfaces, journaled upon said hollow hub and free to move longitudinally thereon between said first two members, two oppositely-disposed and inwardly-projecting ears within said hollow hub at one end, parallel pins journaled in said ears, a series of toggle-links connected with opposite ends of said pins, a toggle-head free to move within the opposite end of said hollow hub, parallel pins journaled in said head, a second series of toggle-links connected with opposite ends of said pins, joint-pins connecting the two series of links, rollers journaled on the joint-pins, draw-bolts connecting said toggle-head with said second clutch member, an axially-disposed longitudinally-movable wedge within said hub and contacting with said rollers, means for moving said wedge, one of said series of toggle-links being provided with inwardly-projecting oppositely-disposed lips forming a guiding-support for said wedge, and springs connecting opposing links of the series in a manner to hold said rollers in contact with said wedge.

In witness whereof we hereto affix our signatures in presence of two witnesses.

GEORGE H. ELLIS.
CHARLES I. LONGENECKER.

Witnesses:
M. E. HOLTON,
OSCAR A. ANDERSON.